(12) United States Patent
Fischer et al.

(10) Patent No.: US 7,174,777 B2
(45) Date of Patent: Feb. 13, 2007

(54) METHOD FOR CONTROLLING AT LEAST ONE ACTUATOR IN A MASS FLOW DUCT

(75) Inventors: Reinhard Fischer, Holzkirchen (DE); Bodo Becker, Oberlaindern/Valley (DE); Martin Weiner, Otterfing (DE); Guenther Vogt, Holzkirchen (DE); André Wittmer, Hausham (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/982,939

(22) Filed: Nov. 4, 2004

(65) Prior Publication Data

US 2005/0097945 A1    May 12, 2005

(30) Foreign Application Priority Data

Nov. 7, 2003    (DE) ................. 103 52 467

(51) Int. Cl.
*G01M 19/00* (2006.01)
(52) U.S. Cl. ............. 73/118.1; 73/116; 73/117.2; 73/117.3
(58) Field of Classification Search ........... 73/116, 73/117.2, 117.3, 118.1
See application file for complete search history.

(56) References Cited

U.S. PATENT DOCUMENTS

| | | | |
|---|---|---|---|
| 3,690,115 A | | 9/1972 | Clayton |
| 4,378,677 A | * | 4/1983 | Zumstein ............. 60/606 |
| 4,679,984 A | * | 7/1987 | Swihart et al. ........ 415/163 |
| 5,481,462 A | | 1/1996 | Nagai |
| 5,586,574 A | * | 12/1996 | Smith ............. 137/487.5 |
| 5,865,205 A | * | 2/1999 | Wilmer ................ 137/2 |
| 5,974,870 A | | 11/1999 | Treinies et al. |
| 6,109,249 A | | 8/2000 | Wild et al. |
| 6,561,207 B2 | * | 5/2003 | Lowery et al. ........... 137/1 |
| 6,687,601 B2 | * | 2/2004 | Bale et al. ............. 701/108 |
| 6,877,369 B2 | * | 4/2005 | Matsunaga et al. ...... 73/118.1 |
| 2004/0074311 A1 | * | 4/2004 | Lull et al. ............. 73/861 |

* cited by examiner

*Primary Examiner*—Edward Lefkowitz
*Assistant Examiner*—Freddie Kirkland, III
(74) *Attorney, Agent, or Firm*—Kenyon & Kenyon LLP

(57) ABSTRACT

A method for controlling at least one actuator in a mass flow duct, which makes it possible to implement a predefined pressure upstream from the at least one actuator more rapidly. The flow resistance of the mass flow duct is modified by controlling the at least one actuator. A pressure upstream from the at least one actuator in the mass flow duct is predefined. A variable characterizing the flow resistance of the mass flow duct is determined as a function of the predefined pressure. The at least one actuator is controlled to set the related variable characterizing the flow resistance of the mass flow duct.

12 Claims, 3 Drawing Sheets

METHOD FOR CONTROLLING AT LEAST ONE ACTUATOR IN A MASS FLOW DUCT

FIELD OF THE INVENTION

The present invention is directed to a method for controlling at least one actuator in a mass flow duct.

BACKGROUND INFORMATION

Methods for controlling at least one actuator in a mass flow duct are already known, in which the flow resistance of the mass flow duct is modified by controlling the at least one actuator. Such an actuator is a bypass valve in a bypass, for example, which is connected in parallel to a turbine of an exhaust gas turbocharger in an exhaust system branch of an internal combustion engine. A desired boost pressure in an intake pipe of the engine downstream from a compressor of the exhaust gas turbocharger may be set by suitably controlling the bypass valve.

The turbocharged engine is currently usually regulated with regard to the boost pressure. In this case, the pressure in the intake pipe downstream from the compressor is the controlled variable and the position of the bypass valve is the manipulated variable. The delay due to the controlled system and the fact that the way the control device affects the controlled variable is reversed in certain operating ranges both result in the regulation on the basis of a physical model being very complicated. While it is possible to set the steady-state operating points using setpoint values for the position of the bypass valve or to set the boost pressure using a characteristics map, difficulties arise in dynamic operation for which such a regulation structure does not provide optimum resolution.

SUMMARY

An example method according to the present invention for controlling at least one actuator in a mass flow duct may have the advantage that a pressure upstream from the at least one actuator in the mass flow duct is predefined, and a related variable that is characteristic for the flow resistance of the mass flow duct is determined as a function of the predefined pressure, and at least one actuator is controlled for setting this related variable characterizing the flow resistance of the mass flow duct. In this way, the predefined pressure may be set with minimum delay, so that an improved dynamic response is achieved. This is particularly advantageous for the use of the example method according to the present invention in an internal combustion engine of a vehicle, the at least one actuator being able to be implemented as a bypass valve in a bypass which is connected in parallel to a turbine of an exhaust gas turbocharger, for example. In this case, a desired exhaust gas counterpressure upstream from the turbine may be set with minimum delay, and thus a very dynamic driving response may be achieved. The corresponding control of the bypass valve may also be integrated into an existing boost pressure regulation as a pilot control.

It may be particularly advantageous if a degree of opening of the at least one actuator is selected as the variable characterizing the flow resistance. In this way, using the degree of opening, the manipulated variable of the at least one actuator may be directly influenced for setting the predefined pressure and thus the predefined pressure may be accurately set as quickly as possible.

Another advantage is that a flow rate parameter proportional to the inverse value of the flow resistance is determined from the predefined pressure, a mass flow through the mass flow duct, and a temperature of the mass flow upstream from the at least one actuator in the mass flow duct; and the value characterizing the flow resistance is derived from the flow rate parameter. In this way, the value characterizing the flow resistance is determined in a particularly simple and cost-effective manner from the predefined pressure.

It may be particularly advantageous if a variable geometry of a turbine in the mass flow duct or a bypass valve of a bypass connected in parallel to a turbine in the mass flow duct is used as the actuator. In this way, an exhaust gas turbocharger may be made to respond more quickly to the setting of a desired exhaust gas counterpressure or a desired boost pressure.

An improved and quicker response may also be achieved for the setting of a desired exhaust gas recirculation rate in an internal combustion engine if the actuator is designed as an exhaust gas recirculation valve in an exhaust gas recirculation channel of the internal combustion engine.

It may be particularly advantageous if a variable characterizing the flow resistance of the at least one actuator is determined from the characteristic variable to be set for the flow resistance of the mass flow duct and associated with the predefined pressure, and this variable is set by controlling the actuator. In this way, the flow resistance to be set for the mass flow duct is achieved in a particularly simple manner by setting the flow resistance of the at least one actuator derived therefrom.

It may be particularly advantageous if a plurality of actuators is used and the adjustment range for setting the variable characterizing the flow resistance is formed by the adjustment ranges of the individual actuators for setting the variables characterizing the flow resistances of the individual actuators. In this way, the flow resistance of the mass flow duct to be set may also be achieved by cascading actuators as the case may be for multistage turbocharging in an internal combustion engine. When a plurality of actuators is used for setting the desired flow resistance of the mass flow duct, the desired flow resistance of the mass flow duct may also be set in a more differentiated manner. This means that there are more usable degrees of freedom for setting the desired flow resistance of the mass flow duct without having to make a compromise regarding the response time for implementing the desired flow resistance of the mass flow duct.

It may be particularly advantageous if adjustment ranges of at least two actuators are controlled in an overlapping manner. In this way, there is a transition range in which the desired flow resistance of the mass flow duct may be set by controlling these two actuators. This permits tolerances to be compensated for, in particular in the case in which each of the two actuators is associated with a turbine of an exhaust gas turbocharger, for example, to control the boost pressure or the exhaust gas counterpressure. The tolerances result, for example, from the different response characteristics of the exhaust gas turbocharger's turbines.

It may also be advantageous if the adjustment ranges of all actuators are controlled without overlap. In this way, a maximum possible overall adjustment range may be used for achieving the desired flow resistance of the mass flow duct.

One advantageous application of example method according to the present invention results if an exhaust system branch of an internal combustion engine is selected as the mass flow duct, the exhaust gas driving at least one turbine, in particular of an exhaust gas turbocharger, and if an actuator is associated with at least one turbine for influencing the flow resistance of the exhaust system branch in the area of this turbine as a function of the predefined pressure upstream from the first turbine in the exhaust system branch. In this way, the response time of an exhaust gas turbocharger for setting a desired boost pressure or a desired exhaust counterpressure may be minimized.

BRIEF DESCRIPTION OF THE DRAWINGS

An exemplary embodiment of the present invention is depicted in the figures and explained in detail below.

DETAILED DESCRIPTION OF EXAMPLE EMBODIMENTS

Figure 1:
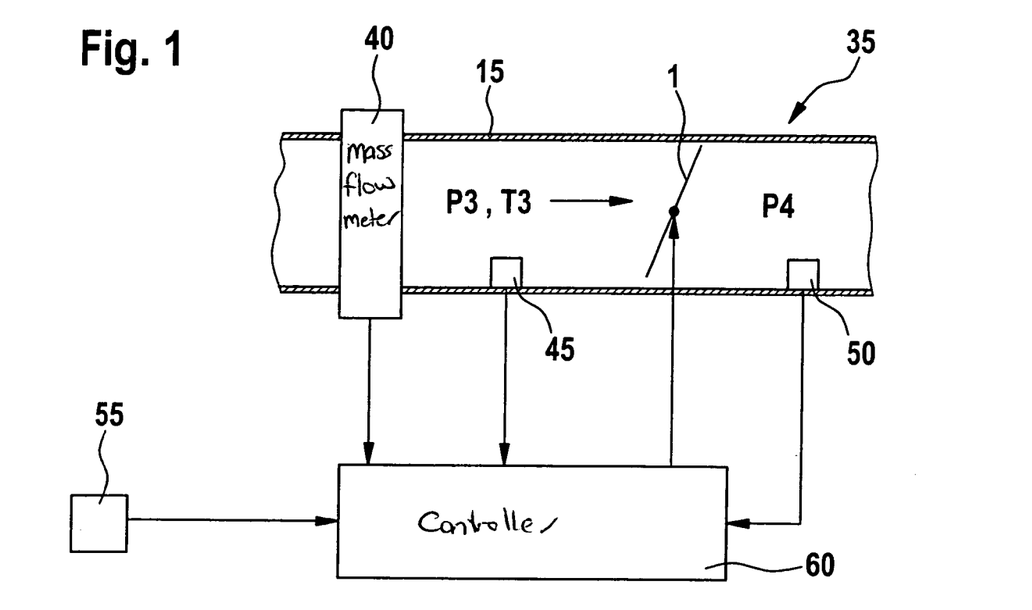
FIG. 1 shows a schematic view of a mass flow duct having an actuator.

In FIG. 1, reference numeral 15 designates a mass flow duct. Mass flow duct 15 may be a component of an internal combustion engine 35, for example. Internal combustion engine 35 may drive a vehicle, for example. An actuator 1 is situated in mass flow duct 15. Actuator 1 may be designed as a throttle valve, for example. In this case, mass flow duct 15 represents an air supply of internal combustion engine 35, via which fresh air may be supplied to one or more cylinders 111, 112, 113, 114 of internal combustion engine 35. Actuator 1 may also be an exhaust recirculation valve. In this case, mass flow duct 15 represents an exhaust recirculation channel of internal combustion engine 35, via which exhaust gas may be recirculated from an exhaust system branch 20 of internal combustion engine 35 into the air supply of internal combustion engine 35. Actuator 1 may also be implemented as a bypass valve in a bypass of internal combustion engine 35. Such a bypass may bypass the throttle valve in the air supply of internal combustion engine 35 or a turbine of an exhaust gas turbocharger in exhaust system branch 20 of internal combustion engine 35 or a compressor in the air supply of internal combustion engine 35. Actuator 1 may also be used for changing a geometry of a turbine of an exhaust gas turbocharger in exhaust system branch 20 of internal combustion engine 35. In FIG. 1 the flow direction of the mass flow in mass flow duct 15 is shown by an arrow. According to the example of FIG. 1, mass flow duct 15 includes a mass flow meter 40, which may be implemented as a hot-film mass flow meter, for example. Mass flow meter 40 is situated upstream from actuator 1 in mass flow duct 15. It measures mass flow ṁ through mass flow duct 15 and relays the measured value to a controller 60. Furthermore, a temperature sensor 45 is situated in mass flow duct 15, upstream from actuator 1, this temperature sensor measuring temperature T3 of the mass flow upstream from actuator 1 and relaying the measured value to controller 60. A pressure sensor 50 is situated downstream from actuator 1 in mass flow duct 15, this pressure sensor measuring pressure p4 downstream from actuator 1 in mass flow duct 15 and relaying the measured value to controller 60. Furthermore, a set value unit 55 is provided, which provides a value for pressure p3 to be set upstream from actuator 1 in mass flow duct 15.

The pressure drop across actuator 1 may be written using flow resistance coefficient ζ as follows:

$$\Delta p = \zeta_k \frac{\rho}{2} v^2 \qquad (1)$$

where $\Delta p = p3 - p4$. $\zeta_k$ is the flow resistance coefficient for a kth actuator in mass flow duct 15, where k=1 . . . n and n is equal to the number of actuators used in mass flow duct 15. The flow resistance coefficient for a particular actuator may be determined experimentally, for example. In FIG. 1, n=1, i.e., only one actuator is used. ρ is the density of the mass transported through mass flow duct 15, for example, the density of fresh air in the case in which mass flow duct 15 is designed as the air supply of internal combustion engine 35, or the density of the exhaust gas in the case in which mass flow duct 15 is implemented as the exhaust system branch of internal combustion engine 35. v is the flow velocity through actuator 1 and is determined from the following equation:

$$v = \frac{\dot{V}}{A} \qquad (2)$$

$\dot{V}$ is the volume flow through actuator 1. Thus, for opening cross section area A of actuator 1 which acts as an opening, mass flow ṁ results as follows:

$$\dot{m} = A \sqrt{\frac{2\rho \Delta p}{\zeta_k}} \qquad (3)$$

If two openings having flow resistance coefficients $\zeta_1$, $\zeta_2$ and both opening cross section areas A1, A2 are connected in parallel, the following applies for overall mass flow ṁ overall with the same pressure differential Δp:

$$\dot{m}_{overall} = \sqrt{2\rho\Delta p}\left(\frac{A_1}{\sqrt{\zeta_1}} + \frac{A_2}{\sqrt{\zeta_2}}\right) \qquad (4)$$

Flow resistance Rk may be determined from opening cross section area Ak and flow resistance coefficient $\zeta_k$ of an opening in a manner analogous to the electrical resistance as follows:

$$R_k = \frac{\sqrt{\zeta_k}}{A_k} \qquad (5)$$

The same rules as for electrical resistors connected in parallel apply. In the case of n openings connected in parallel in mass flow duct 15, the following is obtained for the inverse value of overall flow resistance $R_{overall}$:

$$\frac{1}{R_{overall}} = \frac{1}{R_1} + \ldots + \frac{1}{R_n} \quad (6)$$

where R1, . . . ,Rn are the flow resistances of the n openings.

Such a parallel connection is formed by dividing mass flow duct 15 into n parallel branches, an actuator or an opening being situated in each of these branches. The branches are subsequently brought together again. If no opening is situated in one of these branches, the flow resistance in this branch is obtained in a similar manner according to equation (5), the opening cross section area corresponding to the effective cross section area of the branch, and the flow resistance coefficient may be determined experimentally, for example.

If two openings are connected in series, the same mass flow $\dot{m}$ flows through both according to equations (3) and (5). This results in the following for overall flow resistance $R_{overall}$:

$$\frac{1}{R_1}\sqrt{2\rho(p_0 - p_1)} = \quad (7)$$

$$\frac{1}{R_{total}}\sqrt{2\rho(p_0 - p_2)} \text{ and } \frac{1}{R_2}\sqrt{2\rho(p_1 - p_2)} =$$

$$\frac{1}{R_{overall}}\sqrt{2\rho(p_0 - p_2)} \Rightarrow p_1 =$$

$$p_2 + \frac{R_2^2}{R_{overall}^2}(p_0 - p_2) \text{ substituting } \frac{1}{R_{overall}^2}2\rho(p_0 - p_2) =$$

$$\frac{1}{R_1^2}2\rho(p_0 - p_2)\left(1 - \frac{R_2^2}{R_{overall}^2}\right)$$

where p0 is the pressure upstream from the first opening; p1 is the pressure downstream from the first opening and upstream from the second opening, and p2 is the pressure downstream from the second opening. R1 is the flow resistance of the first opening, and R2 is the flow resistance of the second opening.

In the case of a connection in series, attention should be paid to the fact that pressure differential $\Delta p$ is in the radicand, and therefore the squares of flow resistances R1, . . . , Rn must be added in the case of a series connection of n openings.

$$R_{overall} = \sqrt{R_1^2 + \cdots + R_n^2} \quad (8)$$

According to equations (1), (2), and (5), the following applies for pressure differential $\Delta p$ across actuator 1 or across a plurality of actuators connected in series and/or in parallel having overall flow resistance $R_{overall}$ in mass flow duct 15 in the case of the flow of an ideal gas:

$$p_3 - p_4 = \frac{1}{2}\dot{m}^2\frac{R_{gas}T_3}{p_3}R_{overall}^2$$

where $R_{gas}$ is the gas constant of the ideal gas. In the case of fresh air flow through mass flow duct 15, gas constant $R_{freshgas}$ is used in the case of fresh air instead of $R_{gas}$, and in the case of exhaust gas flow through mass flow duct 15, gas constant $R_{exhaustgas}$ is used for the exhaust gas instead of $R_{gas}$ in equation (9). p3 and T3 are the pressure and temperature upstream from actuator 1 or from all actuators forming overall flow resistance $R_{overall}$. Furthermore, the following applies for the derivation of equation (9) from equation (1):

$$\rho = \frac{p_3}{T_3 R_{gas}} \quad (10)$$

Introducing mass flow parameter MFP according to $$MFP = \frac{\dot{m}\sqrt{T_3}}{p_3} \quad (11)$$

the following applies for the inverse value of overall flow resistance Roverall:

$$\frac{1}{R_{overall}} = MFP\sqrt{\frac{1}{2}R_{gas}}\sqrt{\frac{p_3}{p_3 - p_4}} \quad (12)$$

According to the present invention, considering the system according to FIG. 1, pressure p3 to be set upstream from actuator 1 is predefined by set value unit 55, and this predefined value is relayed to controller 60. Controller 60 then determines, according to equation (11), mass flow parameter MFP from mass flow $\dot{m}$ measured by mass flow meter 40, temperature T3 upstream from actuator 1 measured by temperature sensor 45, and predefined pressure p3 upstream from actuator 1. Overall flow resistance $R_{overall}$, i.e., in this case the flow resistance of actuator 1, which is required for achieving predefined pressure p3 upstream from actuator 1, is then determined with the help of equation (12) from predefined pressure p3 upstream from actuator 1, pressure p4 downstream from actuator 1 measured by pressure sensor 50, gas constant $R_{gas}$, and mass flow parameter MFP determined according to equation (11). Gas constant $R_{gas}$ is known in engine controller 60 for the gas flowing through mass flow duct 15. Actuator 1 is now controlled in such a way that the calculated flow resistance results. Flow resistance coefficient $\zeta_k$ of actuator 1 being known, opening cross section area Ak of actuator 1 necessary for achieving the desired flow resistance may then be determined using equation (5) and set. Opening cross section area Ak of actuator 1 is a variable which characterizes the flow resistance of actuator 1. If actuator 1 is controlled by controller 60 to set the required flow resistance, i.e., the associated opening cross section area, predefined pressure p3 upstream from actuator 1 is settable with minimum delay. The opening cross section area then corresponds to a degree of opening of actuator 1, i.e., it is associated with it in controller 60. Actuator 1 may thus also be controlled by controller 60 to set the corresponding degree of opening in order to achieve the required opening cross section area. The degree of opening of actuator 1 is thus also a variable characterizing the flow resistance of actuator 1. It is useful in this case to store the relationship between flow resistance and control signal for actuator 1 in the form of a characteristic curve.

Figure 2:
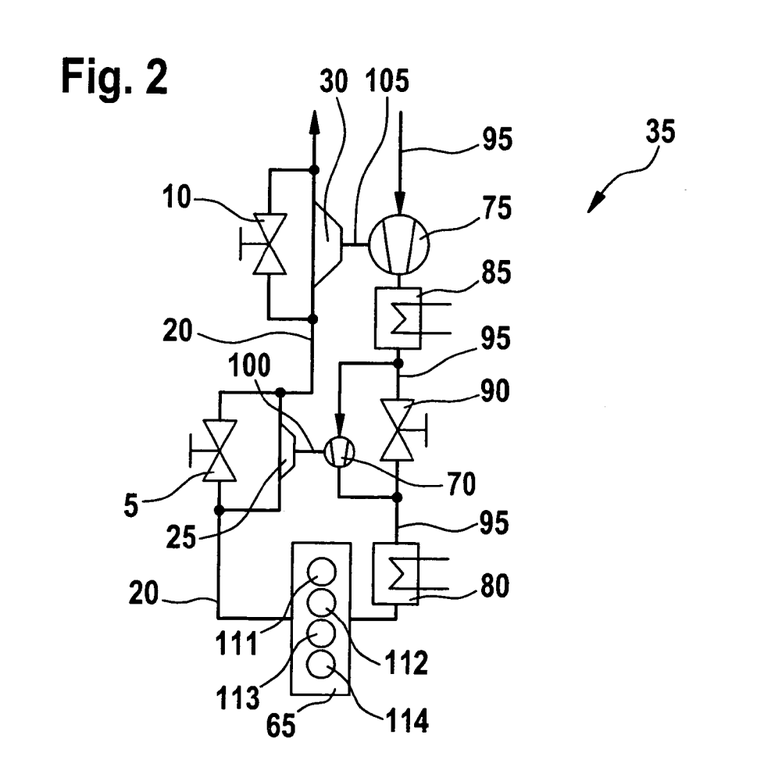
FIG. 2 shows an internal combustion engine having two exhaust gas turbochargers.

In the following, it will be assumed as an example that mass flow duct 15 is an exhaust system branch of internal combustion engine 35. This situation is shown in FIG. 2, where the exhaust system branch is designated by reference numeral 20. Fresh air is supplied to an engine block 65 having four cylinders 111, 112, 113, 114 via an air supply 95. First, a first charge air cooler 80 is situated upstream from engine block 65. A first compressor 70 and a third bypass having a third bypass valve 90, connected in parallel, are situated upstream from first charge air cooler 80. A second charge air cooler 85 is situated upstream from these devices connected in parallel. A second compressor 75 is situated upstream from charge air cooler 85. First compressor 70 and second compressor 75 compress the air supplied to engine block 65. The compressed air is cooled again by first charge air cooler 80 and second charge air cooler 85. The compressing performance of first compressor 70 is influenceable by the third bypass having third bypass valve 90 in that more or less air is made to bypass first compressor 70 by being conducted through third bypass valve 90 depending on the degree of opening of third bypass valve 90. First compressor 70 is driven, via a first shaft 100, by a first turbine 25 in exhaust system branch 20 of internal combustion engine 35. A first bypass having first bypass valve 5 is connected in parallel to first turbine 25. A second compressor 30 and a second bypass having a second bypass valve 10, connected in parallel, are situated in exhaust system branch 20, downstream from these devices connected in parallel. Second turbine 30 drives second compressor 75 via a second shaft 105. First compressor 70, first shaft 100, and first turbine 25 form a first exhaust gas turbocharger, and second compressor 75, second shaft 105, and second turbine 30 form a second exhaust gas turbocharger. It is initially assumed for the sake of simplicity that only first exhaust gas turbocharger is present, and not second exhaust gas turbocharger. Both first bypass valve 5 and first turbine 25 may be regarded as openings. Two openings are thus connected in parallel in exhaust system branch 20. Upstream from these devices connected in parallel, pressure p3 and temperature T3 prevail; downstream from the same pressure p4 prevails. Overall flow resistance $R_{overall}$ of both openings connected in parallel thus results in $$\frac{1}{R_{overall}} = \frac{1}{R_1} + \frac{1}{R_2} \quad (13)$$

where R1 is the flow resistance of first turbine 25, and R2 is the flow resistance of first bypass valve 5. The flow resistance of a turbine may be determined from its characteristic curve and is approximately constant; the following equation applies for the turbine:

$$\dot{V} = \frac{1}{R}\sqrt{\frac{2\Delta p}{\rho}} \quad (14)$$

In equation (14), $\dot{V}$ is the volume flow through the turbine, and R is the flow resistance of the turbine. Flow resistance R1 of the first turbine is known in controller 60. Necessary flow resistance R2 of first bypass valve 5 may thus be determined using equation (13) after overall flow resistance $R_{overall}$ has been determined using equation (12). Controller 60 may then control first bypass valve 5 to set its flow resistance R2, for example, by appropriately controlling the opening cross section area or the degree of opening of first bypass valve 5. Overall flow resistance $R_{overall}$ is a variable characterizing the flow resistance of the mass flow duct, in this case of exhaust system branch 20.

The implementation of internal combustion engine 35 featuring two exhaust gas turbochargers according to FIG. 2 is discussed in the following. In this case there is a serial connection of two pairs of openings connected in parallel. Overall flow resistance $R_{overall}$ thus results as follows:

$$R_{overall} = \sqrt{\left(\frac{R_1 R_2}{R_1 + R_2}\right)^2 + \left(\frac{R_3 R_4}{R_3 + R_4}\right)^2} \quad (15)$$

where R1 is the flow resistance of first turbine 25; R2 is the flow resistance of first bypass valve 5; R3 is the flow resistance of second turbine 30; and R4 is the flow resistance of second bypass valve 10. Flow resistances R1, R3 of first turbine 25 and second turbine 30 are constant and known in controller 60.

Figure 3:
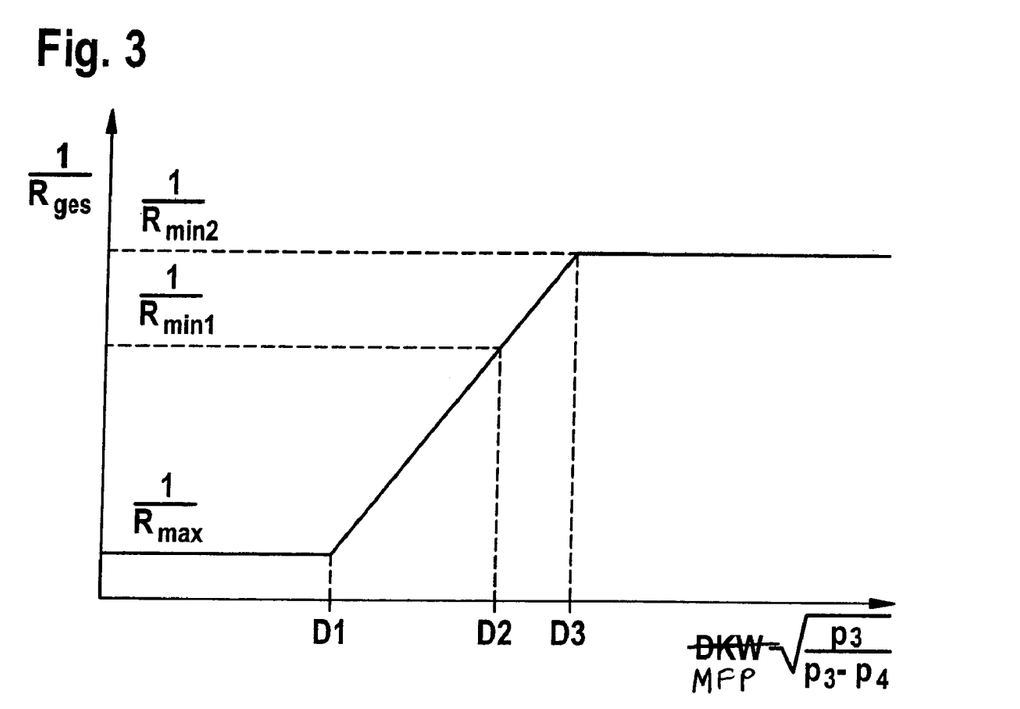
FIG. 3 shows a diagram illustrating the course of the inverse value of the overall flow resistance of the mass flow duct plotted against a mass flow parameters.

FIG. 3 shows a diagram of the course of the inverse value of overall flow resistance $R_{overall}$ as a function of flow rate parameter DKW multiplied by $$\sqrt{\frac{p_3}{p_3 - p_4}},$$

where p3 is, as previously, the pressure to be set upstream from first turbine 25, and p4 is now the pressure prevailing downstream from second turbine 30. Overall flow resistance $R_{overall}$ is maximum up to a first value D1 for the product $$MFP\sqrt{\frac{p_3}{p_3 - p_4}}$$

and is equal to Rmax. In this case both bypass valves 5, 10 in exhaust system branch 20 are fully closed. It is thus impossible for an overall flow resistance that is greater than maximum flow resistance Rmax to be established.

From first value D1 to a second value D2 of the product $$MFP\sqrt{\frac{p_3}{p_3 - p_4}},$$

the inverse value of overall flow resistance $R_{overall}$ increases linearly to a value $$\frac{1}{R_{min1}},$$

where a first minimum value $R_{min1}$ is reached for overall flow resistance $R_{overall}$. This is the case when first bypass valve 5 has been completely opened, while second bypass valve 10 is still fully closed. From second value D2 to a third value D3 of the product $$MFP\sqrt{\frac{p_3}{p_3 - p_4}},$$

the inverse value of overall flow resistance $R_{overall}$ increases linearly to a value $$\frac{1}{R_{min2}},$$

where a second minimum value $R_{min2}$ is reached for overall flow resistance $R_{overall}$. This is the case when first bypass valve 5 and second bypass valve 10 are fully open. Subsequently, i.e., for values greater than third value D3, overall flow resistance $R_{overall}$ cannot be further reduced, so that the inverse value of overall flow resistance $R_{overall}$ remains constant. The adjustment range for setting overall flow resistance $R_{overall}$ is thus divided into two subranges, each covered by one of the two bypass valves 5, 10 in exhaust system branch 20, and which may be set without overlap by the two bypass valves 5, 10 via controller 60 as described above. First bypass valve 5 is adjusted to a value between the fully closed and fully open state when second bypass valve 10 is closed to set an overall flow resistance $R_{overall}$ between first minimum value $R_{min1}$ and maximum flow resistance $R_{max}$. However, if overall flow resistance $R_{overall}$ is to be between second minimum value $R_{min2}$ and first minimum value $R_{min1}$, second bypass valve 10 is adjusted to a value between the fully closed and fully open states while first bypass valve 5 is fully open. When first bypass valve 5 is fully open, almost single-stage operation of internal combustion engine 35 may prevail again with respect to turbocharging, in which second turbine 30 is almost exclusively affected. As an alternative, the two adjustment ranges may also overlap, so that a transition range is formed in which overall flow resistance $R_{overall}$ is set by first bypass valve 5 as well as second bypass valve 10 being adjusted by controller 60 to a value between the fully closed and fully open state, bypass valves 5, 10 in exhaust system branch 20 being neither fully open or fully closed. Although this slightly reduces the overall adjustment range, tolerances may be compensated when both turbines 25, 30 are in operation, and, for example, operation of one of the two turbines 25, 30 at an excessive speed may be avoided. Second turbine 30 may be protected from operating at an excessive speed and thus from damage by prematurely opening second bypass valve 10. Prematurely opening second bypass valve 10 means that second bypass valve is opened before first bypass valve 5 is fully open.

Similarly, internal combustion engine 35 may be operated using an exhaust gas turbocharger in that the corresponding turbine is not connected in parallel to a bypass having a bypass valve, but the flow resistance in the area of the turbine is set with the help of a variable adjustment of the turbine geometry. In this case, the controller causes a turbine geometry associated with the flow resistance to be set using an appropriate actuator.

The bypass valves may be throttle valves or exhaust valves, for example, which are appropriately controlled by controller 60.

Similarly, internal combustion engine 35 may also be operated using more than two exhaust gas turbochargers, overall flow resistance $R_{overall}$ being determined according to equation (6) or equation (8), and the overall adjustment range for overall flow resistance $R_{overall}$ being divided into more than two adjustment ranges according to FIG. 3, provided that one actuator is assigned to each of the more than two exhaust gas turbochargers, i.e., more than two turbines. It is also possible not to assign an actuator to each turbine for influencing the flow resistance in the area of the turbine. Furthermore, it is also possible for one exhaust gas turbocharger to implement one actuator for influencing the flow resistance as a bypass valve in a bypass for the respective turbine and, for another exhaust gas turbocharger, to implement an actuator for influencing the flow resistance in such a way that it influences the geometry of the respective turbine. The flow resistance may also be influenced in the area of a turbine by a plurality of actuators. This may be achieved by using a plurality of bypasses, each having a bypass valve, or by at least one bypass having a bypass valve and an actuator for influencing the geometry of the turbine.

Thus, using the example method according to the present invention, the overall flow resistance to be set $R_{overall}$ may be calculated and set directly via at least one actuator. This makes a very dynamic driving response possible. The control of at least one actuator by controller 60 as described above may also be integrated into an existing boost pressure regulation as a pilot control. As is evident from equation (11) for mass flow parameter MFP, the exhaust gas mass flow, as mass flow ṁ flowing through exhaust system branch 20, and exhaust gas temperature T3 upstream from first turbine 25 play a central role for the above-described control of bypass valves 5, 10 in exhaust system branch 20 according to the embodiment of FIG. 2. As described in FIG. 1, the corresponding variables may be measured using mass flow meter 40 and temperature sensor 45. They may, however, also be modeled from the performance quantities of internal combustion engine 35 in a conventional way. It is advantageous if it is possible to predict temperature T3. Steady-state exhaust gas temperature T3 which is established at a certain operating point of internal combustion engine 35 may be predicted, for example, using a characteristic map applied on a test bench as a function of the engine speed and the engine load which may be determined, for example, from the amount of fuel supplied, in a manner known to those skilled in the art. In this way, directly after a load change or speed change, the achievable steady-state exhaust gas temperature T3 is used for controlling bypass valves 5, 10 in exhaust system branch 20, whereby bypass valves 5, 10 may also be moved to a predicted position regarding their degrees of opening thus making it possible to set desired exhaust gas counterpressure p3 upstream from first turbine 25 even faster. Pressure p4 downstream from second turbine 30 may also be measured using a pressure sensor such as pressure sensor 50 according to FIG. 1 or modeled in a conventional way. When modeling the exhaust gas mass flow, exhaust gas temperature T3, and pressure p4 downstream from second turbine 30, the respective sensors may be omitted. Further simplification results if pressure p4 downstream from second turbine 30 is significantly less than predefined pressure p3 upstream from first turbine 25. In this case, pressure p4 downstream from second turbine 30 may be neglected, so that equation (12) simplified is written as follows:

$$\frac{1}{R_{overall}} = MFP\sqrt{\frac{1}{2}R_{gas}} \qquad (16)$$

The exhaust gas pressure, i.e., pressure p3 upstream from first turbine 25, may be determined as a function of the operating point from a characteristic map having the engine speed and engine load as input quantities. Exhaust gas counterpressure p3 as the output quantity of this characteristic map is then predefined in a conventional manner according to a boost pressure to be established for this operating point, i.e., the instantaneous engine speed and engine load, in air supply 95 downstream from first compressor 70. The characteristic map may also be suitably applied on a test bench. Thus, a boost pressure to be set for an instantaneous operating point regarding engine speed and engine load may be rapidly implemented in a simple manner by controlling at least one of the two bypass valves 5, 10 in exhaust system branch 20.

Calculation using the opening equation according to equation (1) represents a simplification for a polytropic change in state of a nozzle flow. If this equation is used as a basis, the following applies instead of equation (12):

$$A_{T,\mathit{eff}}\psi = \qquad (17)$$

$$MFP\sqrt{\frac{1}{2}R_{gas}} \text{ where } \psi = \sqrt{\frac{n}{n-1}\left(\frac{p_4}{p_3}\right)^{\frac{2}{n}}\left[1-\left(\frac{p_4}{p_3}\right)^{\frac{n-1}{n}}\right]}$$

and $A_{T,\mathit{eff}}$ is the equivalent cross section area for an equivalent nozzle and $\psi$ is the flow rate function, n being the polytropic exponent.

This yields for the overall flow resistance $$\frac{1}{R_{overall}}\sqrt{\frac{p_3 - p_4}{p_3}} = A_{T,\mathit{eff}}\psi \qquad (18)$$

This calculation, however, is only significant for flow rates having velocities around the velocity of sound. This does not change anything in the above-described control method.

Figure 4:
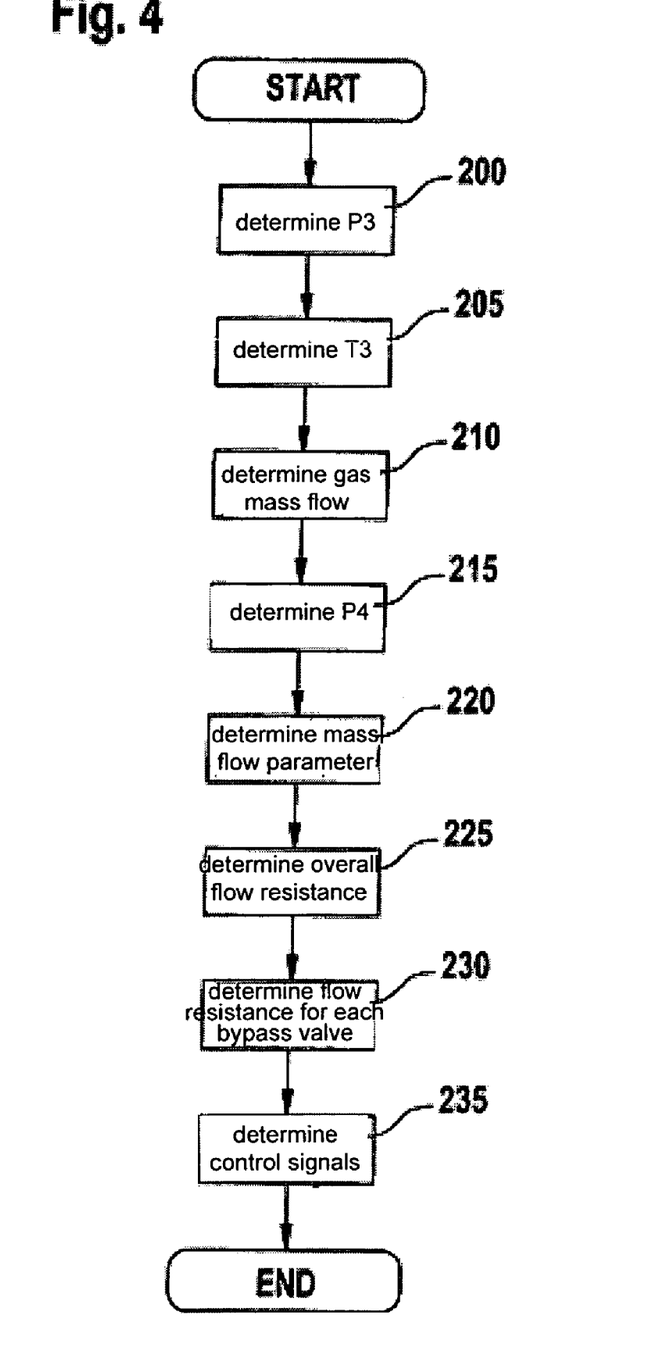
FIG. 4 shows a flow chart of an exemplary sequence of an example method according to the present invention.

FIG. 4 shows a flow chart for an exemplary sequence of the method according to the present invention with respect to internal combustion engine 35 depicted in FIG. 2. After the start of the program, at program point 200, controller 60 uses the signal of set value unit 55 to determine exhaust gas counterpressure p3 to be set upstream from first turbine 25. As described above, set value unit 55 uses a characteristic map to determine exhaust gas counterpressure p3, for example, from the instantaneous engine speed and instantaneous engine load as a function of the operating point. The program then branches to a program point 205.

At program point 205, controller 60 determines exhaust gas temperature T3 upstream from first turbine 25. This is accomplished by analyzing the signal of temperature sensor 45 or by modeling as described above. The program then branches to a program point 210.

At program point 210, controller 60 determines the exhaust gas mass flow by analyzing the signal of mass flow meter 40 or by modeling as described above. The program then branches to a program point 215.

At program point 215, controller 60 determines pressure p4 downstream from second turbine 30 by analyzing the signal of the pressure sensor used for this purpose or by modeling as described above. In the case in which pressure p4 downstream from second turbine 30 is negligible compared to exhaust gas pressure p3, program point 215 may also be skipped. The program then branches to a program point 220.

At program point 220, controller 60 determines, according to equation (11), mass flow parameter MFP from predefined exhaust gas counterpressure p3, exhaust gas temperature T3, and the exhaust gas mass flow. The program then branches to a program point 225.

At program point 225, controller 60 determines overall flow resistance $R_{overall}$ to be set, according to equation (12), taking into account pressure p4 downstream from second turbine 30 or according to equation (16) without taking into account pressure p4 downstream from second turbine 30. The program then branches to a program point 230.

At program point 230, controller 60 determines a flow resistance for each of the two bypass valves 5, 10 in exhaust system branch 20 of internal combustion engine 35 to achieve overall flow resistance $R_{overall}$. A pair of associated values of a flow resistance for first bypass valve 5 and a flow resistance for second bypass valve 10 may be stored in controller 60 for each value of overall flow resistance $R_{overall}$ in the linear range of the curve of the inverse value of overall flow resistance $R_{overall}$ between first value D1 and third value D3. Overlapping or overlap-free adjustment ranges may be implemented as described above. Controller 60 accesses the pair of values associated with instantaneous overall flow resistance $R_{overall}$ to be set and obtains a flow resistance to be set for first bypass valve 5 and a flow resistance to be set for second bypass valve 10. The program then branches to a program point 235.

At program point 235, the control unit determines, for bypass valves 5, 10, the control signals corresponding to the flow resistances of bypass valves 5, 10. The relationship between the flow resistance of a bypass valve and the corresponding control signal of the bypass valve is stored preferably in the form of a characteristic curve.

At program point 235, controller 60 controls first bypass valve 5 to set the desired flow resistance assigned to it and second bypass valve 10 to set the desired flow resistance assigned to it. The program is then terminated.

Set value unit 55 and controller 60 may be implemented as software and/or hardware in an engine controller of the vehicle.

The turbine performance and thus also the compressor performance which in turn yields the boost pressure are directly influenced using exhaust gas counterpressure p3 via pressure ratio p3/p4.

What is claimed is:

1. A method for controlling at least one actuator in a mass flow duct, a flow resistance of the mass flow duct being modified by controlling the at least one actuator, the method comprising:
   predefining a pressure upstream from the at least one actuator in the mass flow duct;
   determining a related variable characterizing the flow resistance of the mass flow duct as a function of the predefined pressure; and
   performing an open-loop control of the at least one actuator for setting the related variable characterizing the flow resistance of the mass flow duct.

2. The method as recited in claim 1, further comprising:
selecting the flow resistance as the variable characterizing the flow resistance.

3. The method as recited in claim 1, further comprising:
selecting a degree of opening of the at least one actuator as the variable characterizing the flow resistance.

4. The method as recited in claim 1, further comprising:
using a variable geometry of a turbine in the mass flow duct as the actuator.

5. The method as recited in claim 1, comprising:
using a bypass valve of a bypass connected in parallel to a turbine in the mass flow duct as the actuator.

6. The method as recited in claim 1, further comprising:
using one of: i) a throttle valve in an air supply, or ii) an exhaust gas recirculation valve in an exhaust gas recirculation channel of an internal combustion engine, as the actuator.

7. The method as recited in claim 1, further comprising:
determining a variable characterizing the flow resistance of the at least one actuator from a characteristic variable to be set for the flow resistance of the mass flow duct;
allocating the variable characterizing the flow resistance of the at least one actuator to the predefined pressure; and
setting the variable characterizing the flow resistance of the at least one actuator by controlling the actuator.

8. A method for controlling at least one actuator in a mass flow duct, a flow resistance of the mass flow duct being modified by controlling the at least one actuator, the method comprising:
predefining a pressure upstream from the at least one actuator in the mass flow duct;
determining a mass flow parameter proportional to an inverse value of the flow resistance from the predefined pressure, a mass flow through the mass flow duct, and a temperature of the mass flow upstream of the at least one actuator in the mass flow duct;
determining a related variable characterizing the flow resistance of the mass flow duct as a function of the predefined pressure;
deriving the value characterizing the flow resistance from the mass flow parameter; and
controlling the at least one actuator for setting the related variable characterizing the flow resistance of the mass flow duct.

9. A method for controlling at least one actuator in a mass flow duct, a flow resistance of the mass flow duct being modified by controlling the at least one actuator, the method comprising:
predefining a pressure upstream from the at least one actuator in the mass flow duct;
determining a related variable characterizing the flow resistance of the mass flow duct as a function of the predefined pressure;
controlling the at least one actuator for setting the related variable characterizing the flow resistance of the mass flow duct, wherein the at least one actuator includes a plurality of actuators;
forming an adjustment range for setting a variable characterizing the flow resistance of the mass flow duct by adjustment ranges of individual ones of the actuators for setting variables characterizing the flow resistance of the individual actuators.

10. The method as recited in claim 9, wherein the adjustment ranges of at least two of the actuators are controlled in an overlapping manner.

11. The method as recited in claim 9, wherein the adjustment ranges of all of the actuators are controlled without an overlap.

12. A method for controlling at least one actuator in a mass flow duct, a flow resistance of the mass flow duct being modified by controlling the at least one actuator, the method comprising:
predefining a pressure upstream from the at least one actuator in the mass flow duct;
determining a related variable characterizing the flow resistance of the mass flow duct as a function of the predefined pressure;
controlling the at least one actuator for setting the related variable characterizing the flow resistance of the mass flow duct;
selecting an exhaust system branch of an internal combustion engine as the mass flow duct, exhaust gas driving at least one turbine, of a turbocharger; and
assigning the at least one turbine an actuator through which the flow resistance of the exhaust system branch in an area of the turbine is influenced as a function of a predefined pressure upstream from a first one of the turbines in the exhaust system branch.

* * * * *